United States Patent
Yamazaki et al.

(10) Patent No.: US 8,383,980 B2
(45) Date of Patent: Feb. 26, 2013

(54) LASER PROCESSING MACHINE HAVING PROGRAMMABLE FOCUS POSITIONING FUNCTION

(75) Inventors: Tsunehiko Yamazaki, Nagoya (JP); Naoomi Miyakawa, Gifu (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 696 days.

(21) Appl. No.: 12/575,619

(22) Filed: Oct. 8, 2009

(65) Prior Publication Data

US 2010/0096370 A1 Apr. 22, 2010

(30) Foreign Application Priority Data

Oct. 20, 2008 (JP) .................. 2008-269604

(51) Int. Cl.
*B23K 26/14* (2006.01)
(52) U.S. Cl. .................. 219/121.67; 219/121.75
(58) Field of Classification Search ............ 219/121.67, 219/121.68, 121.75, 121.78, 121.83, 121.84
See application file for complete search history.

(56) References Cited

U.S. PATENT DOCUMENTS

| | | | |
|---|---|---|---|
| 5,298,716 A * | 3/1994 | Ogawa et al. ............ | 219/121.67 |
| 6,204,473 B1 * | 3/2001 | Legge ..................... | 219/121.67 |

FOREIGN PATENT DOCUMENTS

| | | |
|---|---|---|
| DE | 19628857 A1 | 1/1998 |
| EP | 1743726 A2 | 1/2007 |
| EP | 1859893 A1 | 11/2007 |
| EP | 2062676 A1 | 5/2009 |
| JP | 08-039281 | 2/1996 |

OTHER PUBLICATIONS

Extended European Search Report corresponding to application No. EP 09405180.2 dated Mar. 3, 2010.

* cited by examiner

*Primary Examiner* — Khiem D Nguyen
(74) *Attorney, Agent, or Firm* — Renner, Otto, Boisselle & Sklar, LLP (57) ABSTRACT

A laser processing unit includes a torch that is automatically mounted on a processing head. The torch has an assist gas chamber and a balance chamber, and the assist gas is supplied to the chambers. Constantly, equal pressures act on the both chambers, and an upward first force and a downward second force that act on a lens holder offset each other because pressure reception areas are equal. Gas is supplied to a gas spring chamber to provide a constant upward force to the lens holder. A driving device has an arm driven by a servomotor. The arm is in contact with a pin and the lens holder is moved to a predetermined position for automatically adjusting a focus position FC of a collective lens.

8 Claims, 12 Drawing Sheets

LASER PROCESSING MACHINE HAVING PROGRAMMABLE FOCUS POSITIONING FUNCTION

The present application is based on and claims priority of Japanese patent application No. 2008-269604 filed on Oct. 20, 2008, the entire contents of which are hereby incorporated by reference.

BACKGROUND OF THE INVENTION

1. Field of the Invention

The present invention relates to a laser processing machine having a programmable focus positioning function.

2. Description of the Related Art

For example, Patent Document 1 described below discloses a laser cutting machine having a focus position adjuster. This Patent Document 1 discloses two mechanisms as a laser beam focus positioning mechanism.

A first mechanism is disclosed in FIGS. 7 and 8 and description thereof. A bend mirror (7) is configured as a mechanism capable of changing mirror curvature, where the mirror curvature is changed by fluid pressure for adjusting focus position.

A second mechanism is disclosed in FIG. 10 and description thereof. A support (27) mounted with a convergence lens (86) is axially moved by a driving means such as pistol/cylinder and a servomotor and pinion/rack to adjust light focus position. Patent Document 1: Japanese Published Unexamined Patent Application No. H8-39281

SUMMARY OF THE INVENTION

The first mechanism disclosed in the above-described Patent Document 1 has problems described below.

A reflection mirror surface of an adaptive mirror is a rotationally symmetrical quasi sphere and spherical aberration causes the following problems where:
1. an outgoing beam quality (characteristics) becomes lower than an incoming beam quality,
2. a mode of outgoing beam collapses, and
3. misalignment occurs because outgoing beam is not directed at 90 degree.

Further, in the second mechanism, a driving mechanism is required to mount on a torch of the laser cutting machine, so that it is difficult to apply it to the laser processing machine capable of automatically exchanging the torch.

An object of the present invention is to provide a laser processing machine having a programmable focus position adjust function that can be applied to a laser processing, where plurality units of torches having plurality of properties are prepared for automatically exchanging the most appropriate torch.

In order to achieve the above object, a laser processing machine includes a torch that is exchangeably mounted on a processing head of the laser processing machine of the present invention. As a basic means, the torch includes a torch body, a lens holder that holds a collective lens and is mounted axially slidably in the torch body, an assist gas chamber that is provided between a lens holder and a nozzle attached to a tip of the torch, a balance chamber that is provided on a processing head side of the lens holder, a passage that supplies assist gas to the assist gas chamber and the balance chamber, and a gas spring chamber that is provided in an outer peripheral portion of the lens holder and urges the lens holder toward the processing head side. Further a driving device mounted on a processing head side includes a servomotor that is driven by a program of a numerical control device and the arm has a programmable positioning function of positioning the lens holder in an axial direction by contacting with the lens holder.

Further, a pressure reception area of the assist gas chamber is formed to be equal to that of the balance chamber. Therefore, a first force acting on the lens holder upwards is provided in the assist gas chamber and a second force acting on the lens holder downwards is provided in the balance chamber, and the lens holder is held in a stop position due to offset between the first force and the second force.

Further, the torch includes a slit that is formed in the torch body and extends in an axial direction and a pin that is attached to the lens holder and projects outside of the torch body through the slit, and the arm of the driving device is in contact with the pin for positioning the lens holder toward the torch.

A mechanism for driving the arm of the driving device in an axial direction includes a ball screw that is rotatably driven by a servomotor, a nut that is attached to the arm and screwed together with the ball screw, and a translation guide that guides the arm in an axial direction. A gas spring circuit that supplies a positive gas to the gas spring chamber of the torch includes a two-port valve for switching the positive gas sent to the gas spring chamber to atmosphere.

Further the torch having a plurality of properties is prepared in a torch change magazine and the torch includes a device for automatically exchanging the most appropriate torch. Further the torch is driven by a driving device that is separately placed from the torch body.

According to the laser processing machine of the present invention that includes the above-described means, it is possible to automatically adjust a light focus position of the laser beam even during the laser processing. Further it is possible to instruct adjustment timing and adjustment amount on the program of the numerical control device.

Further because plural torches are exchangeably mounted, it is possible to automatically adjust a position of the collective lens to the light focus position appropriate to the torch every torch exchange.

Accordingly, it is possible to automatically set up the most appropriate processing condition to improve laser process efficiency.

DESCRIPTION OF THE PREFERRED EMBODIMENTS

Figure 1:
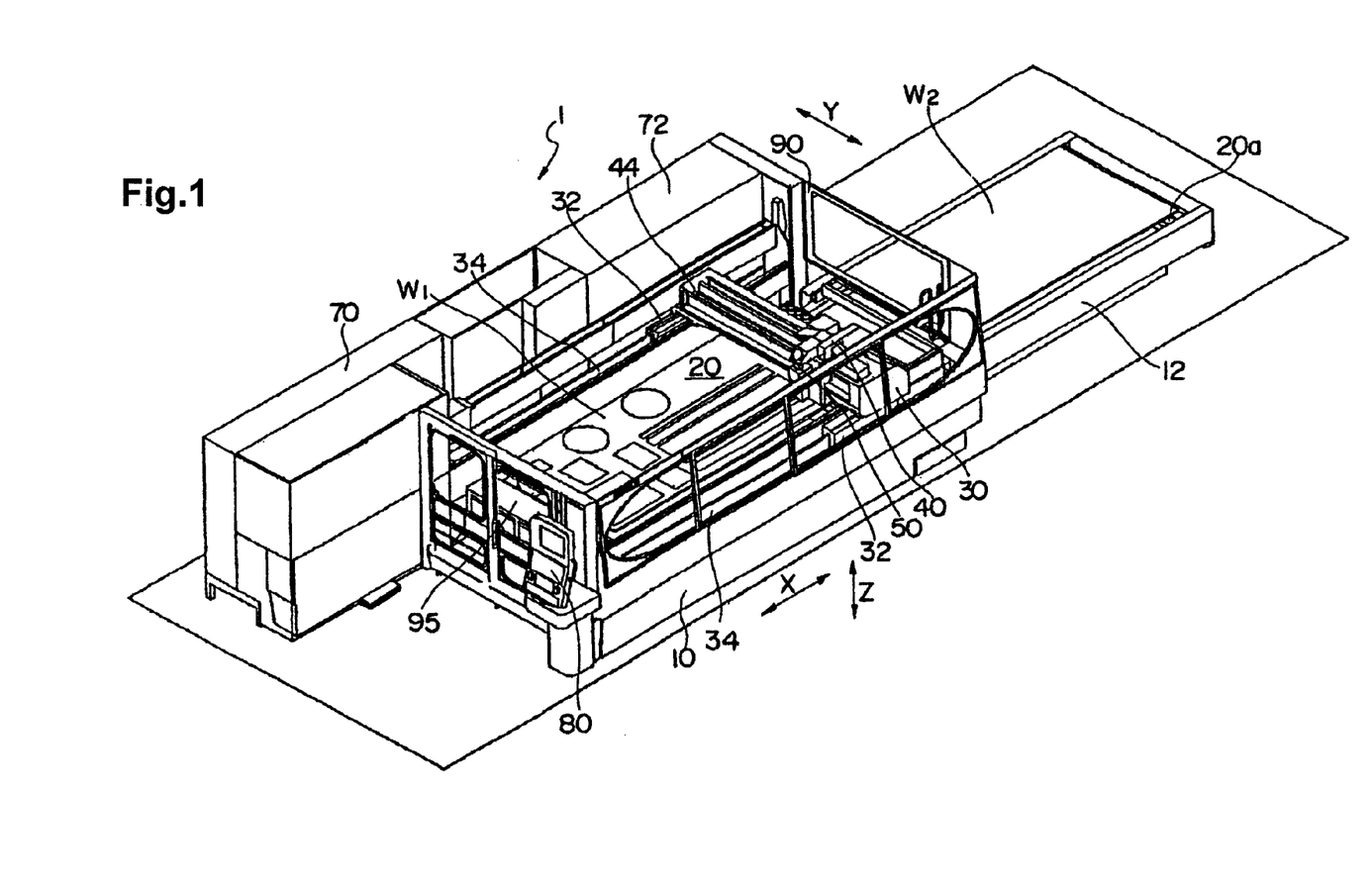
FIG. 1 is an overall perspective view showing a laser processing machine according to the present invention.
Figure 2:
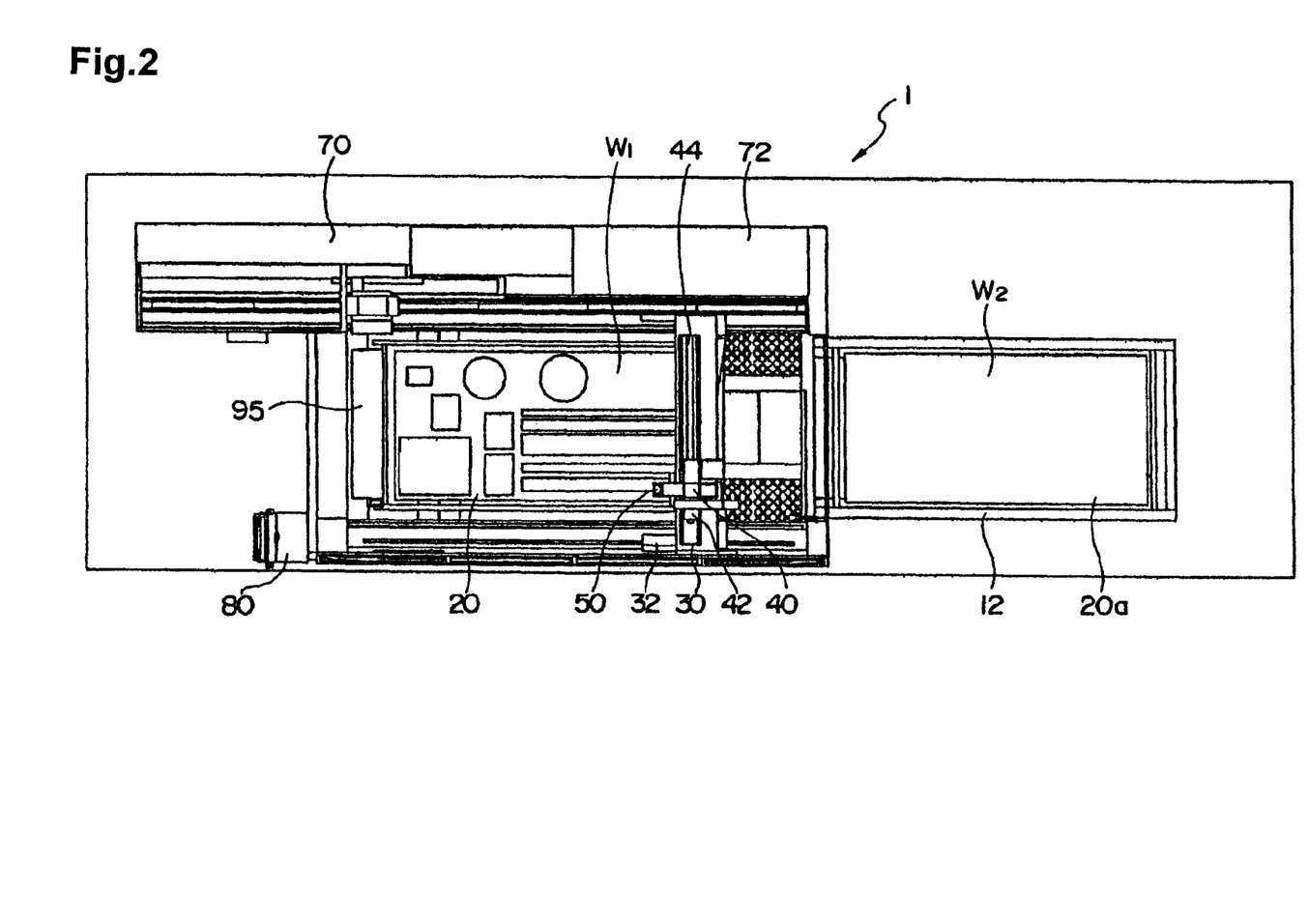
FIG. 2 is a plan view of the laser processing machine according to the present invention.
Figure 3:
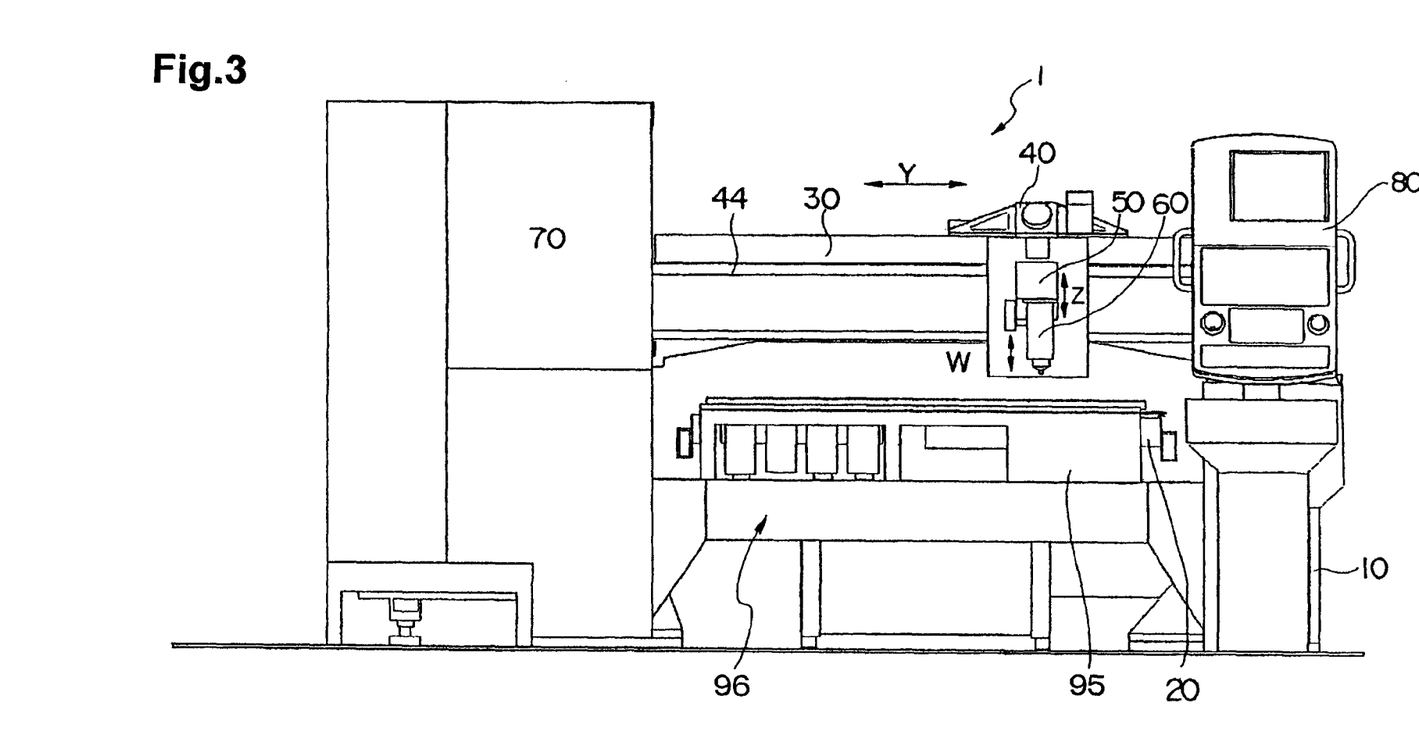
FIG. 3 is a front view of the laser processing machine according to the present invention.
Figure 4:
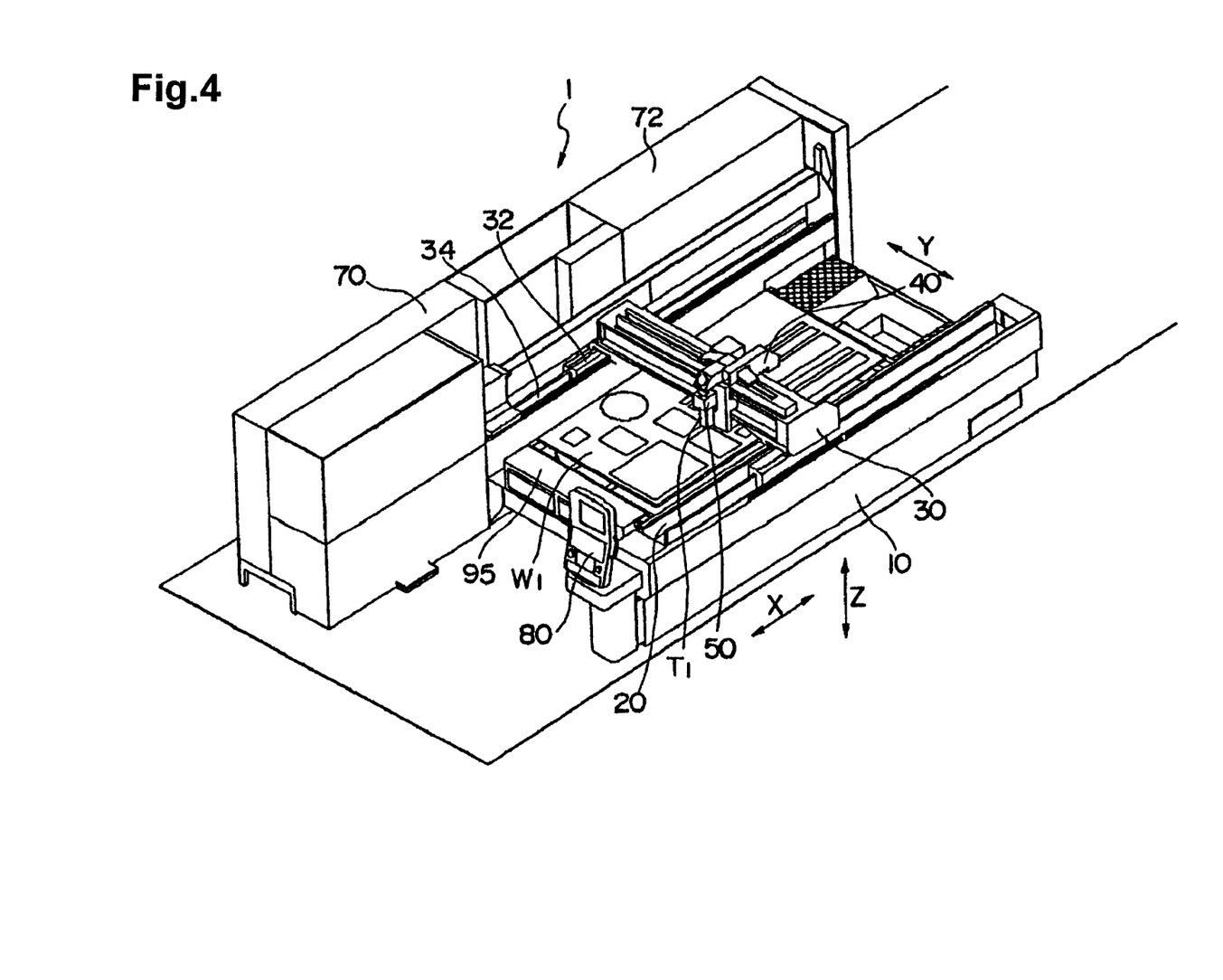
FIG. 4 is a partial perspective view of the laser processing machine according to the present invention.
Figure 5:
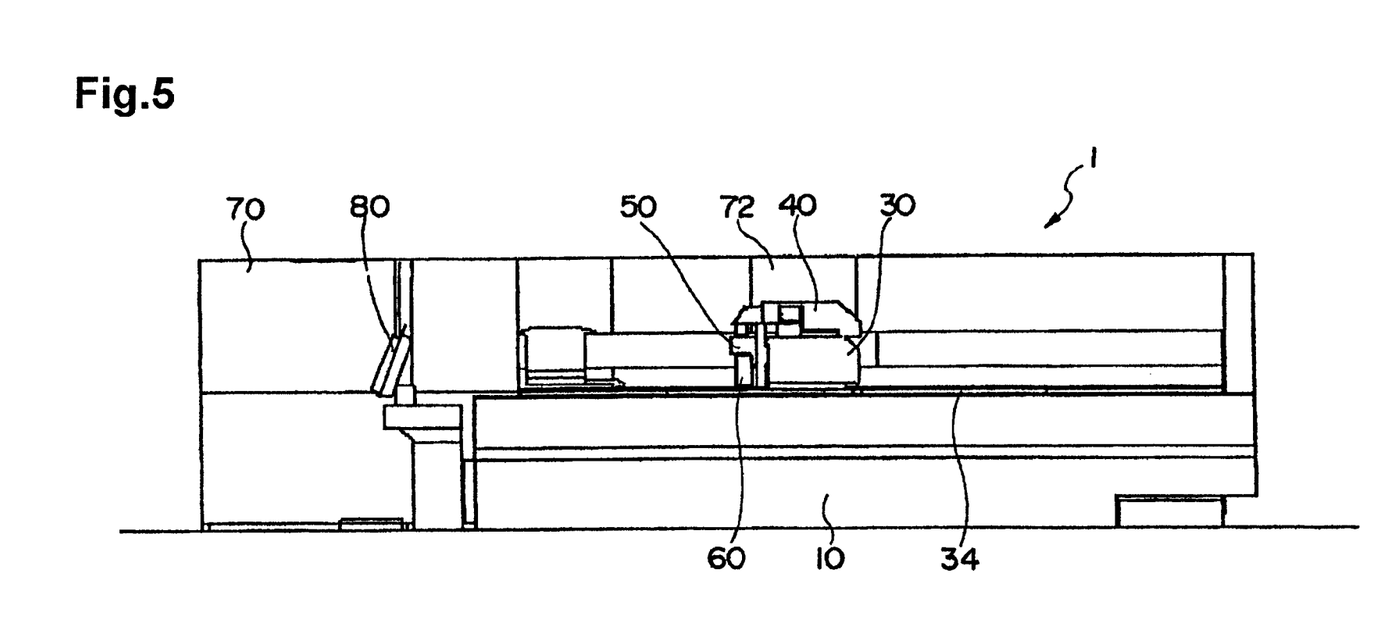
FIG. 5 is a side view of the laser processing machine according to the present invention.

FIG. 1 is an overall perspective view showing a laser processing machine according to the present invention. FIG. 2 is a plan view. FIG. 3 is a front view. FIG. 4 is a partial perspective view. FIG. 5 is a side view.

A laser processing machine entirely referred to by numerical reference 1 has a pallet (table) 20 provided on a bed 10, and a plate-formwork W1 is placed on the pallet 20. A pallet exchange device 12 is arranged in a longitudinal extension of the bed 10, and a pallet 20a placed with a work W2 to be processed next is prepared.

A pair of guide rails 34 is attached to both sides of the bed 10 in a longitudinal direction. A column 30 is mounted on the guide rails 34 movably in an X-axis direction.

For a driving means on X-axis of the column 30, for example a linear motor is used. The linear motor is formed between a stator provided on the guide rail 34 and a mover provided on a translation guide 32.

The column 30 is provided with a guide rail 44 along a Y-axis perpendicular to an X-axis, and a saddle 40 is mounted movably along a Y-axis. The saddle 40 includes a translation guide 42 that engages with the guide rail 44, and a linear motor is formed between the guide rail 44 and the translation guide 42.

The saddle 40 is provided with a guide rail in a direction of a Z-axis perpendicular to a plane formed by an X-axis and a Y-axis, and a processing head 50 is mounted movably along a Z-axis. The processing head 50 includes an optical system where laser beam sent from a laser oscillator 72 is introduced.

A laser processing tool 60 is exchangeably mounted on the processing head 50. A processing area is covered with a cover 90 for securing safety. A strong electric panel 70 and the laser oscillator 72 are arranged in contact with the bed 10. A numerical control device 80 for an operator to instruct various types of driving is arranged at a longitudinal end of the bed 10. A setup station 95 of the laser processing tool is mounted in an end portion proximal to the numerical control device 80 on the bed 10. The setup station 95 includes a torch station 96 for accommodating a torch to be exchanged.

Figure 6:
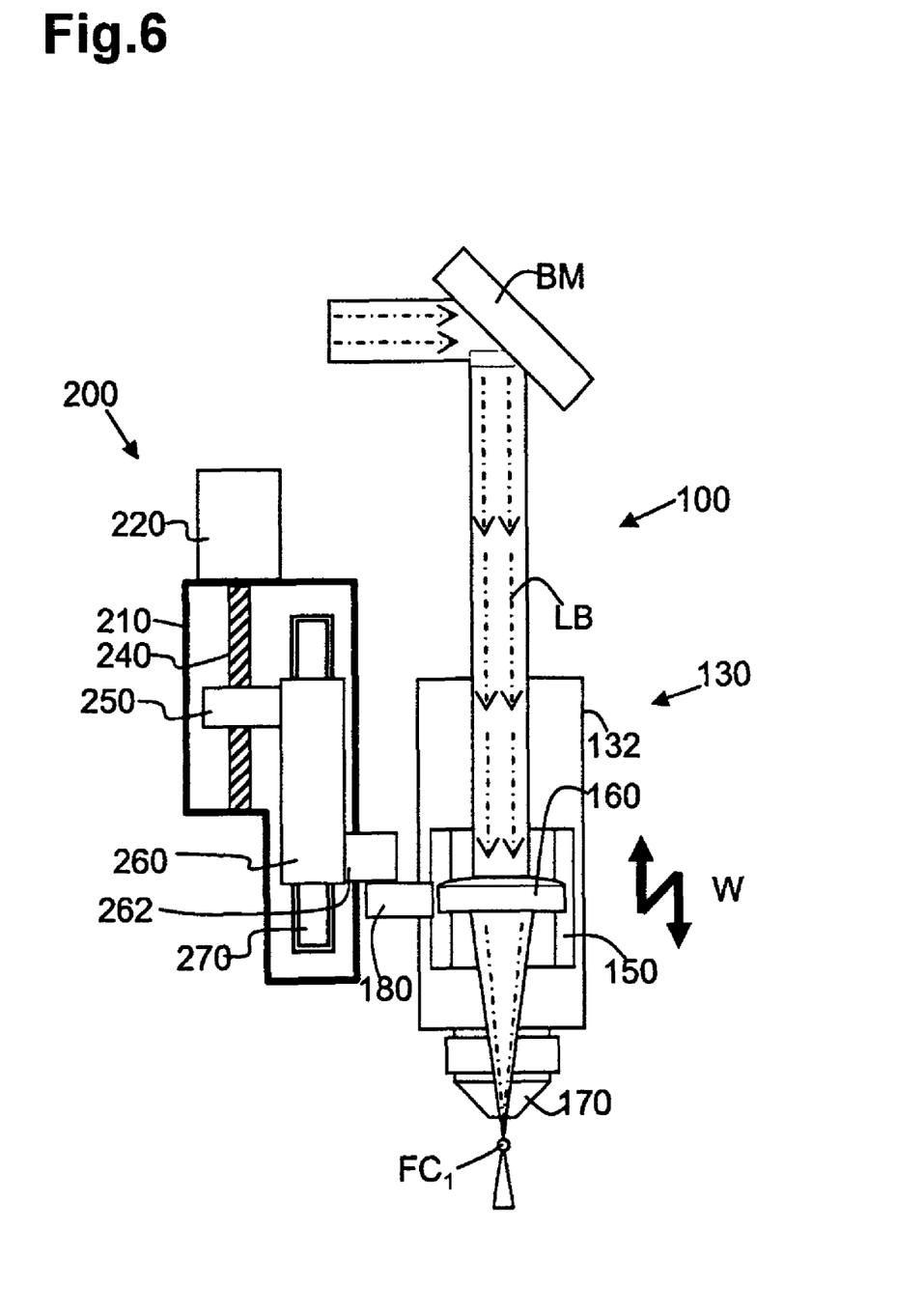
FIG. 6 is an explanatory view showing a principle of the laser processing device having a programmable focus positioning function according to the present invention.
Figure 7:
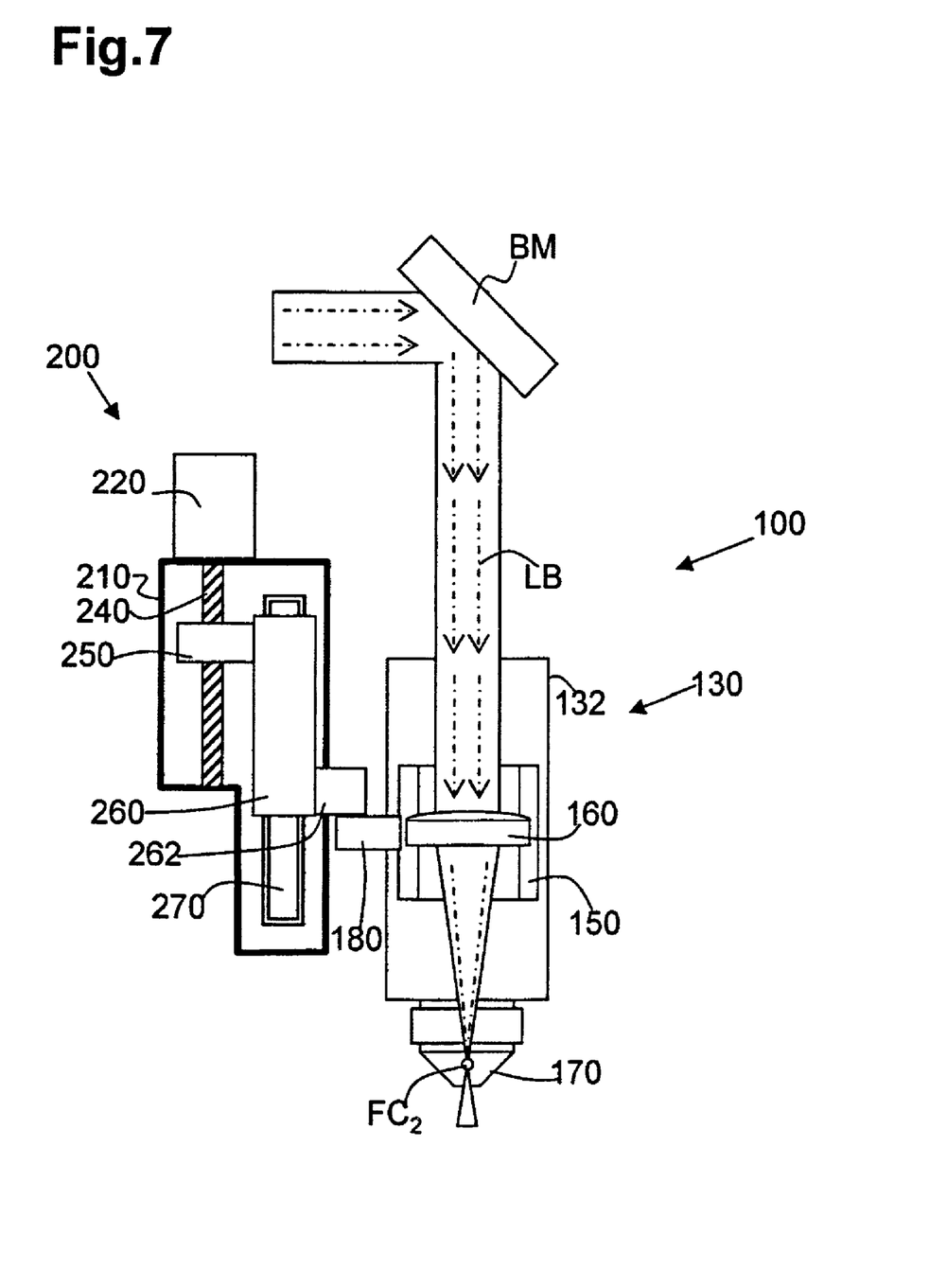
FIG. 7 is an explanatory view showing a principle of the laser processing device having a programmable focus positioning function according to the present invention.
Figure 8:
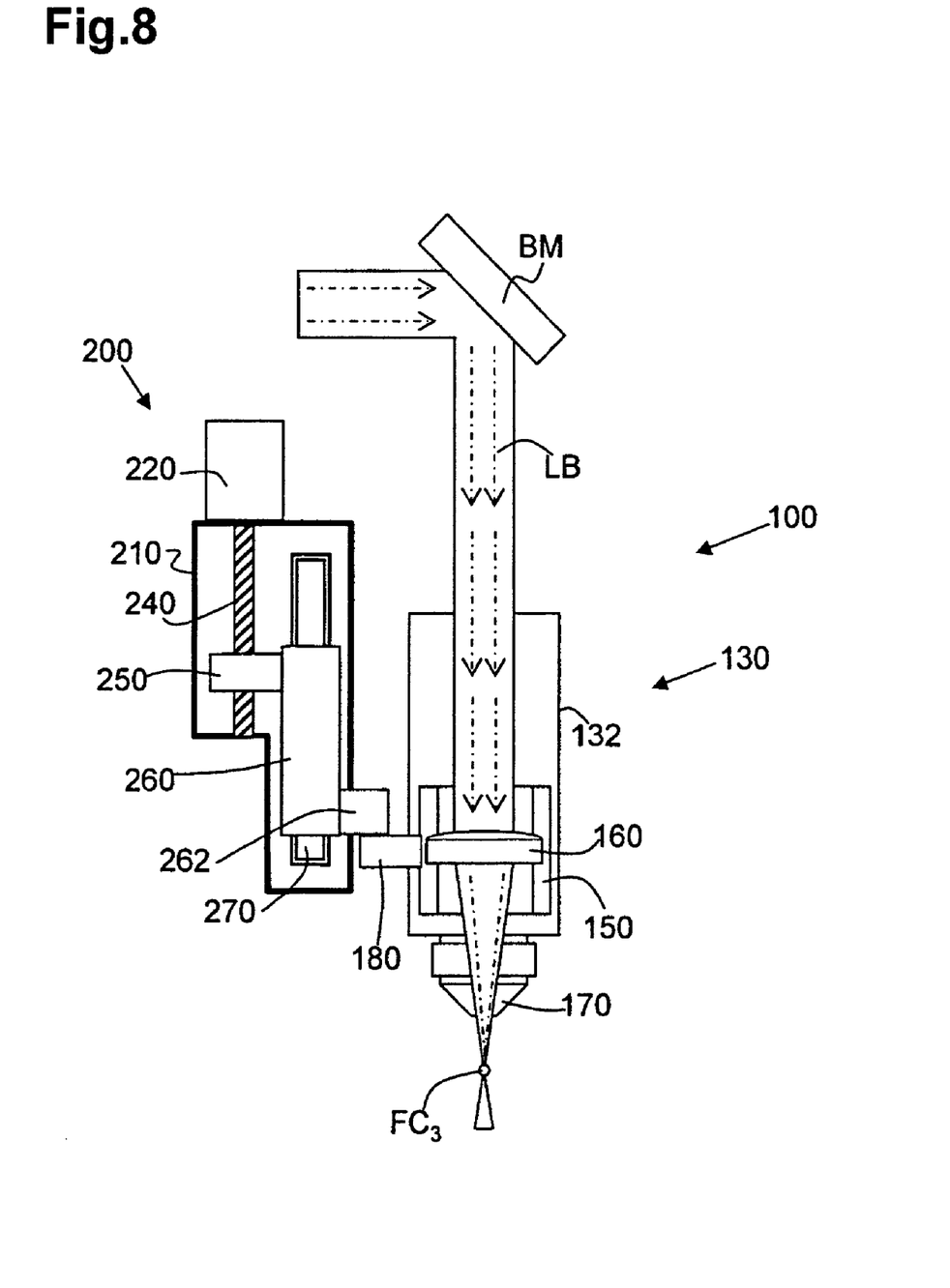
FIG. 8 is an explanatory view showing a principle of the laser processing device having a programmable focus positioning function according to the present invention.

FIGS. 6 to 8 are explanatory views showing a principal of the laser processing device having a programmable focus positioning function according to the present invention.

A laser processing unit entirely referred to by numerical reference 100 has a torch 130 that is exchangeably mounted on a processing head described later.

In the laser processing machine applied to the present invention, plural torches to be exchanged are prepared and a torch appropriate for processing conditions is exchangeably mounted on the processing head.

The torch 130 has a lens holder 150 in a torch body 132, and the lens holder is slidable in a direction of a vertical W-axis. A laser beam LB sent from a laser oscillator 72 is introduced into the torch 130 via various bend mirrors BM and focused by a collective lens 160 to form a light focus position FC1.

In a state shown in FIG. 6, the light focus position FC1 is set up in a position extending from a tip of a nozzle 170 attached to a lower portion of the torch 130.

The lens holder 150 has a pin 180 operated by a driving device 200 provided outside so that a position in a direction of W-axis of the lens holder 150 can be automatically adjusted.

A driving device 200 has a ball screw 240 that is rotatably supported in a housing 210 and is rotated and driven by a servomotor 220.

A nut 250 screwed together with the ball screw 240 is combined with an arm 260, and the arm 260 is linearly guided by a translation guide 270. An end portion 262 of the arm 260 is in contact with an upper surface of the pin 180 of the lens holder 150, and the pin 180 is urged downwards to move the lens holder 150 downwards.

FIG. 7 shows a state where the lens holder 150 in the torch 130 moves upwards from the state of FIG. 6. A mechanism where the lens holder 150 moves upwards following ascent of the arm 260 of the driving device 200 is described in FIGS. 9 onward.

The collective lens 160 moves upwards together with the lens holder 150, and a light focus position FC2 moves into an inside of a torch 170.

FIG. 8 shows a state where the lens holder 150 in the torch 130 moves downwards from the state of FIG. 1. The lens holder 150 moves downwards with descent of the arm 260 of the driving device 200. The collective lens 160 moves downwards together with the lens holder 150, and a light focus position FC3 moves to the position further projecting from the torch 170.

Thus, according to the laser processing device having a programmable focus positioning function according to the present invention, it is possible to arbitrarily change a light focus position in a direction of W-axis even during processing.

Then the light focus position is previously set up in a program in response to a torch to be used and processing conditions, so that the light focus position is automatically set up in the most appropriate position and laser processing is optimized.

Because the lens holder supporting the collective lens is operated by a driving device separately placed outside, the torch needs not to be equipped with a driving mechanism and has a structure suitable for an automatic exchange of torches.

Figure 9:
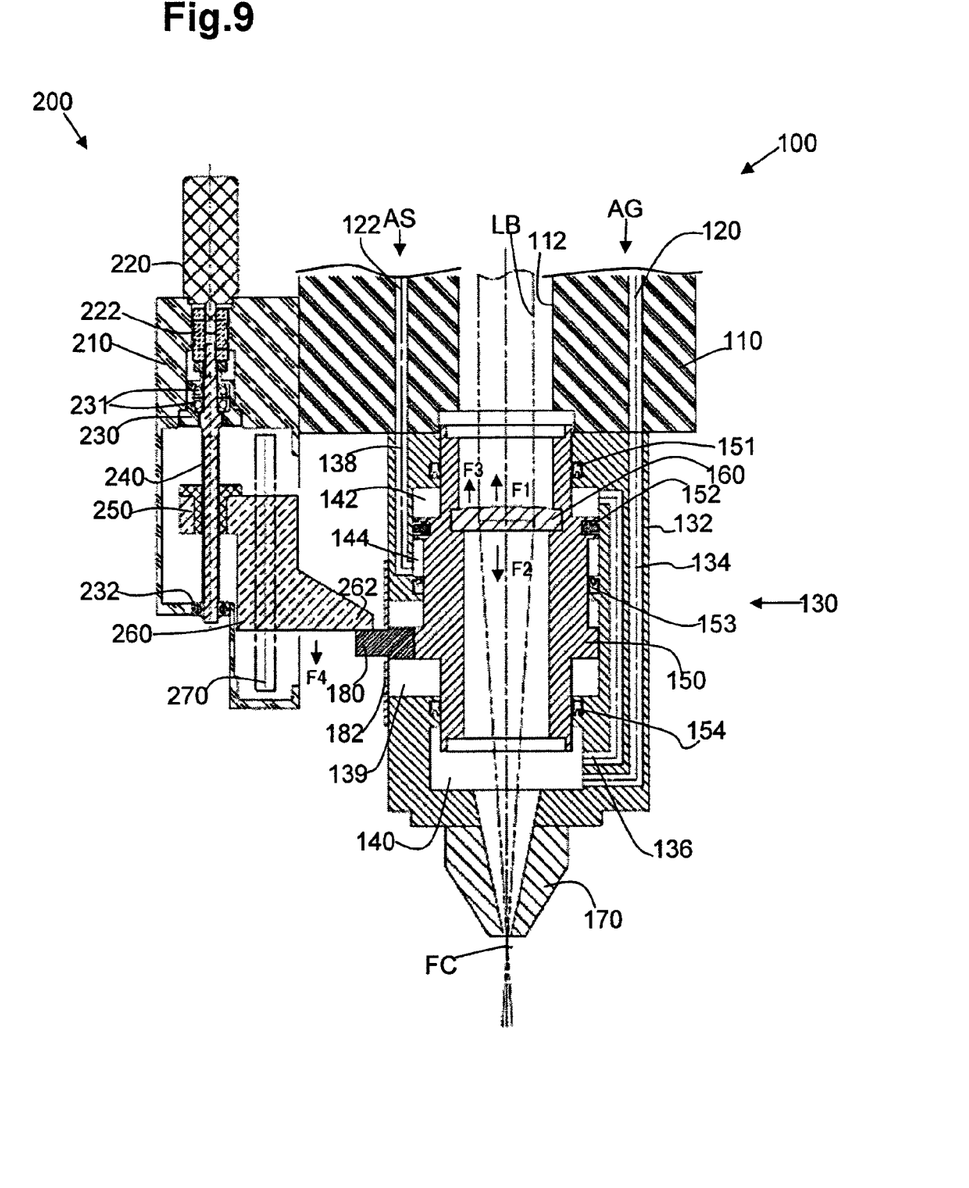
FIG. 9 is a sectional view showing a structure of the laser processing device having a programmable focus positioning function according to the present invention.

FIG. 9 is a sectional view showing a structure of the laser processing unit having a programmable focus positioning function according to the present invention.

The laser processing unit entirely referred to by numerical reference 100 has a torch 130 that is exchangeably mounted on a laser processing head 110.

The laser processing head 110 includes an assist gas AG supply passage 120 and a gas spring gas AS supply passage 122, besides a beam path 112 of a laser beam LB that is sent from a side of laser oscillator 72.

The torch 130 exchangeably mounted on a lower end of the laser processing head 110 has an assist gas passage 134 in a torch body 132, and the assist gas passage 134 is coupled with the assist gas AG supply passage 120 of the laser processing head 110. Another end of the assist gas passage 134 is open to an assist gas chamber 140.

In the torch body 132 of the torch 130, the cylindrical lens holder 150 is slidably inserted in an axial direction. Four pieces of packings 151, 152, 153, 154 are fitted between the lens holder 150 and the torch body 132, for achieving sealing the assist gas AG and the gas AS.

A balance chamber 142 is formed between the first packing 151 and the second packing 152.

The assist gas chamber 140 and the balance chamber 142 are coupled with a balance passage 136. Therefore the assist gas AG supplied to the assist gas chamber 140 is also sent to the balance chamber 142.

The collective lens 160 mounted on the inside of the lens holder 150 collects laser beams LB sent, and thus collected laser beams pass the nozzle 170 for forming the light focus position FC.

A slit 139 extending in an axial direction is provided on a side wall of the torch body 132. An end portion of the pin 180 attached to the lens holder 150 passes through this slit 139 projects toward outside of the torch body 132.

The driving device controls an axial direction position of the lens holder 150 by urging this pin 180 downwards, and the driving device is attached on a side of the laser processing head 110.

A driving device entirely referred to by numerical reference 200 has the servomotor 220 that is attached to the housing 210. A support unit 230 is fixed inside the housing 210 and rotatably supports the ball screw 240, but the ball screw 240 does not move in an axial direction.

The ball screw 240 is supported by bearings 231, 232, and the upper end thereof is coupled with an output axis of the servomotor 220 through a coupling 222.

The nut 250 screwed together with the ball screw 240 is integrally attached to the arm 260.

The arm 260 is slid in a direction parallel to the ball screw 240 by the translation guide 270 provided in the housing 210 side.

An end portion 262 of the arm 260 is in contact with the upper surface of the pin 180 of the lens holder 150, for urging the pin 180 downwards to control a position of the lens holder 150 in an axial direction.

The pin 180 has a cover 182 and the cover covers an opening of the slit 139 of the torch body 132.

Next, an action of the assist gas AG and the gas spring gas AS is described.

Assist gases AG supplied to the assist gas chamber 140 and the balance chamber 142 are equal in pressure. The assist gas AG of the assist gas chamber 140 produces a first force F1 for urging the lens holder 150 upwards. A value of this first force F1 is obtained by multiplying a gas pressure of the assist gas AG by a pressure reception area formed by the fourth packing 154. The assist gas AG supplied to the balance chamber 142 produces a second force F2 for urging the lens holder 150 downwards.

A value of this second force F2 is obtained by multiplying a gas pressure of the assist gas AG by a pressure reception area formed by the second packing 152.

Since the assist gases AG supplied to the assist gas chamber 140 and the balance chamber 142 are equal in pressure, the first force F1 and the second force F2 are determined by diameter sizes of the first packing 151, the second packing 152 and the fourth packing 154.

In this torch 130, since a circular pressure reception area of the assist gas chamber 140 that is obtained by an outer diameter of the forth packing 154 is equal to a doughnut-form pressure reception area of the balance chamber 142 that is obtained by a difference between an outer diameter of the second packing 152 and an inner diameter of the first packing 151, the first force F1 and the second force F2 constantly offset each other.

To a gas spring chamber 144 formed between an inner periphery wall of the torch body 132 and an outer periphery wall of the lens holder 150, gas spring gas AS is supplied through the gas supply passage 122 of the laser processing head 110 and a gas passage 138 of the torch body 132.

This gas AS produces a third force F3 for urging the lens holder 150 upwards.

A value of this third force F3 is obtained by multiplying a pressure of the gas AS by a pressure reception area formed by the third packing 153.

When the arm 260 of the driving device 200 suspends, the lens holder 150 is held in a stop position by a downward fourth force F4 and the upward third force F3 produced in the gas spring chamber 144. This force F4 is expressed as a reaction force F4 by the fixed arm 260.

According to the above-described action, the lens holder 150 in the torch 130 is urged downwards by the arm 260 of the driving device 200 for positioning. This position is controlled by a program instruction of the numerical control device 80 that is provided to the servomotor 220.

Similarly, when the arm 260 is moved upwards by the servomotor 220, the lens holder 150 ascends following to the arm 260 for positioning in the instruction position provided by the program.

Figure 10:
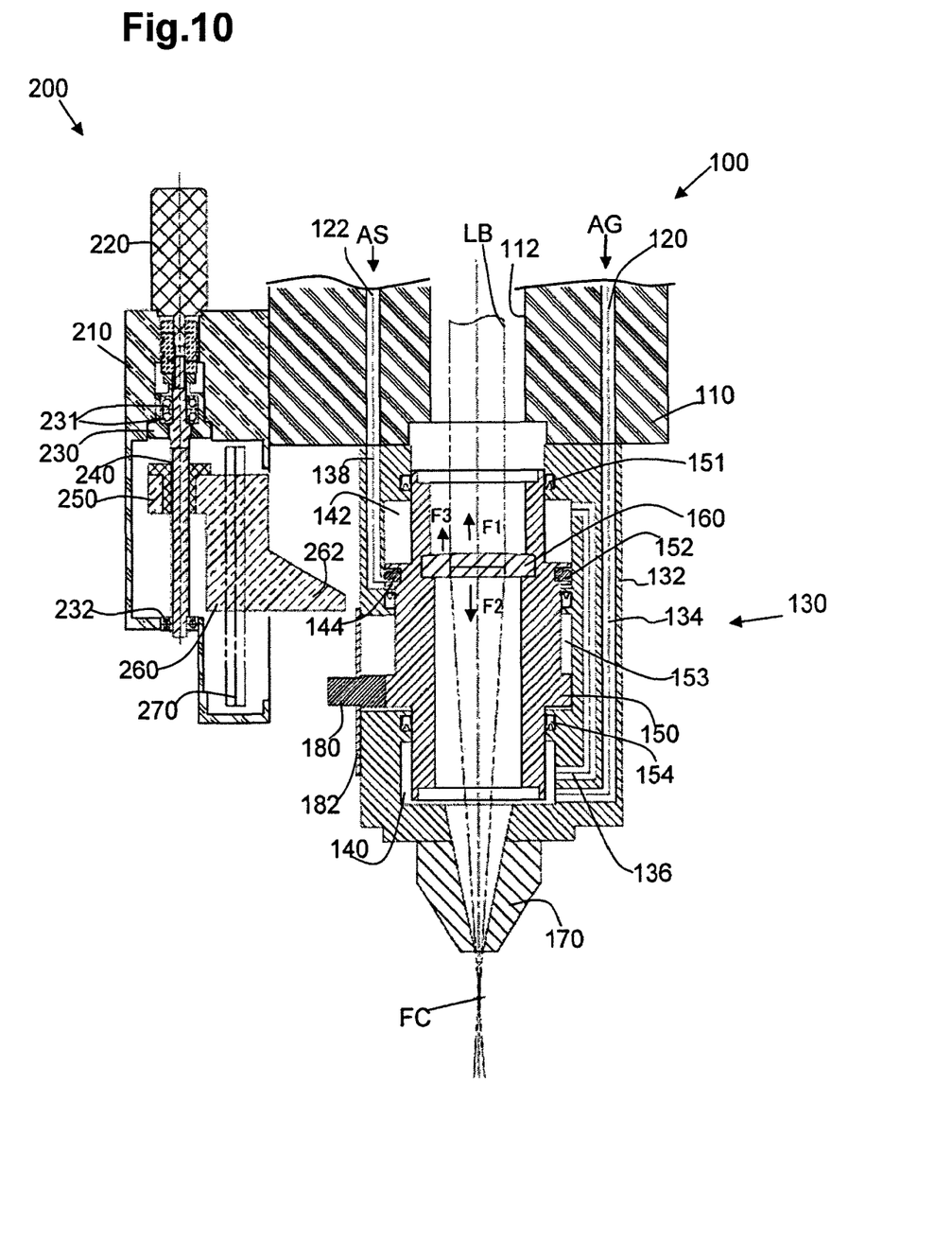
FIG. 10 is a sectional view showing a structure of the laser processing device having a programmable focus positioning function according to the present invention.

FIG. 10 shows a state where a pressure of gas spring gas AS is atmosphere.

The gas spring chamber 144 shrinks to the minimum, and the lens holder 150 suspends in the lowest position and does not ascend.

Figure 11:
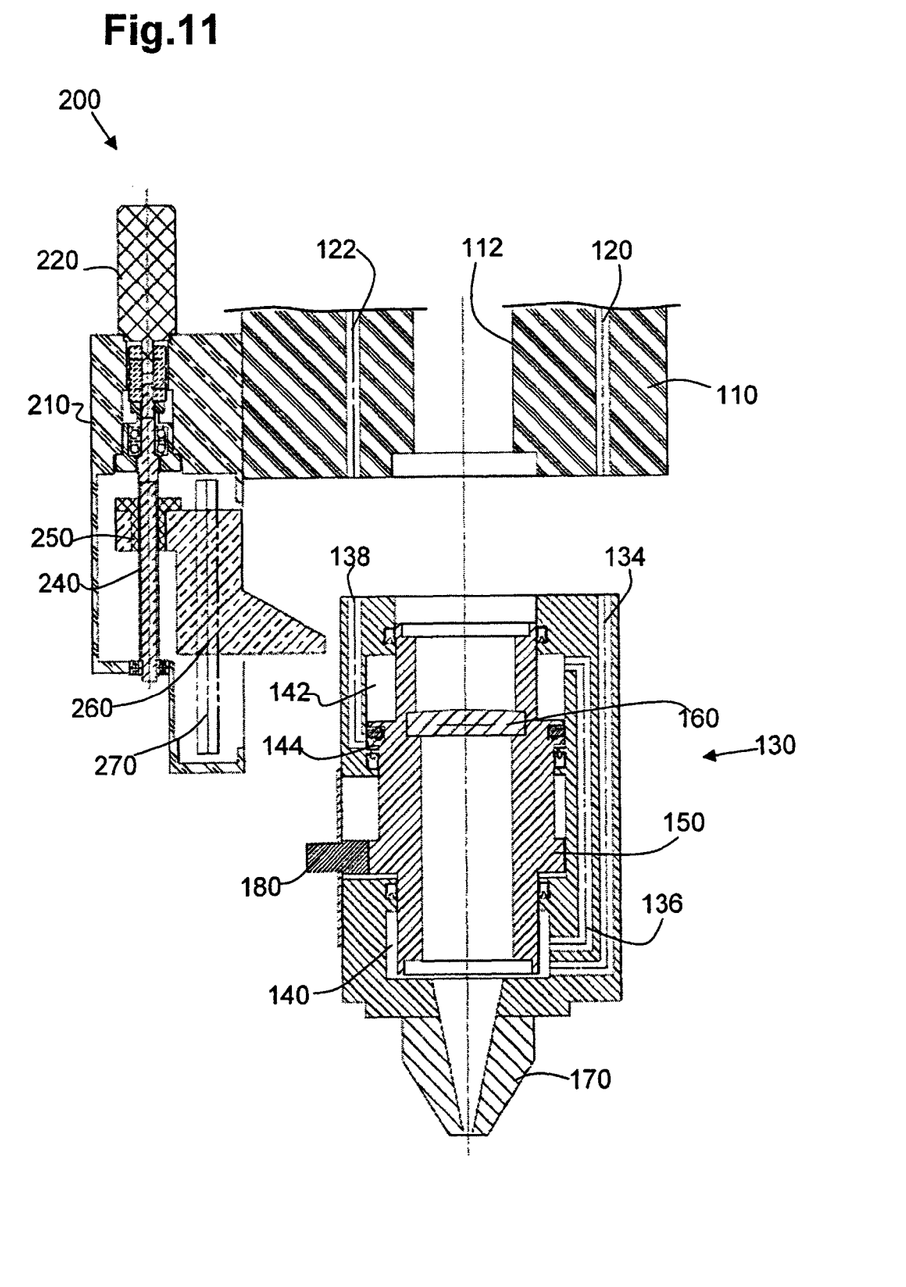
FIG. 11 is an explanatory view showing a state of torch exchange.

FIG. 11 shows a process of exchanging the torch 130. Even when the torch 130 is removed from the laser processing head 110, the gas passage 138 is communicated with an atmosphere, and the lens holder 150 returns to the torch station 96 while being kept in the lowest position.

A new torch is mounted on the laser processing head 110 in a similar state. A positive pressure gas is supplied to the gas spring chamber 144 so that the lens holder 150 ascends up to a position where the pin 180 contacts to the arm 260.

In this state, a focus position is automatically adjusted by the program.

Figure 12:
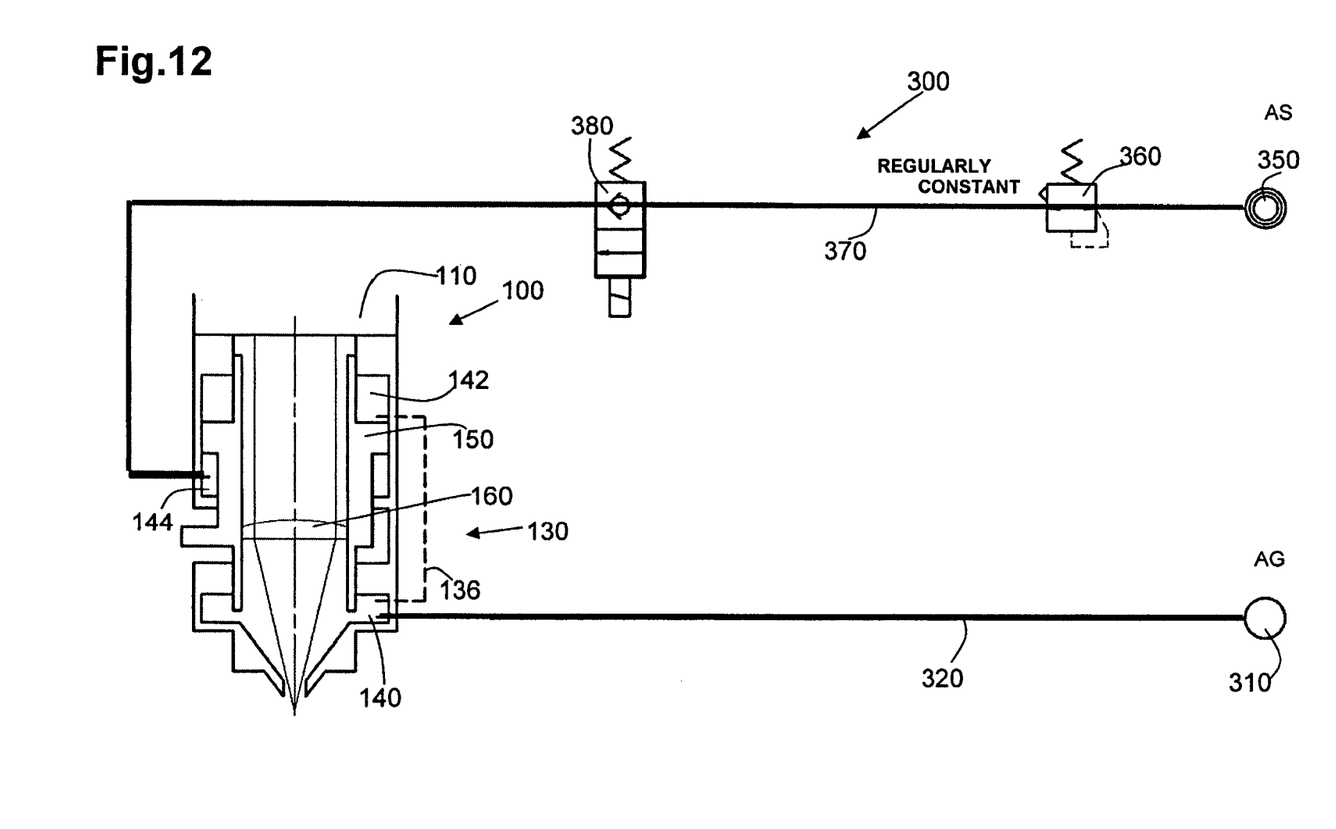
FIG. 12 is an explanatory view showing assist gas and a gas supply line.

FIG. 12 is an explanatory view showing gas supply lines for the assist gas and the gas spring.

A line entirely referred to by numerical reference 300 has a line 320 leading to a supply source 310 of the assist gas AG, and the assist gas AG is supplied to the assist gas chamber 140 of the torch 130. The assist gas AG is supplied at a constant gas pressure.

The gas spring gas AS is sent from a supply source 350. With a gas line that is separated from the line of the assist gas AG, the gas is adjusted by a precision regulator 360 to a gas having a constant pressure. Thus adjusted gas is supplied to the gas spring chamber 144 of the torch through a line 370 and a two-port valve 380. The two-port valve 380 has a function of shutting gas supply during removal of the torch 130.

Thus according to the laser processing machine of the present invention, it is possible that laser beam is automatically adjusted in a focus position previously instructed by a program of the numerical control device 72.

Since the driving device for controlling a position of the lens holder holding the collective lens is mounted on a processing head side, it is suitable for automatic exchange of a torch.

Here, in the above-described embodiment, an example of linear motor is described as a driving means on an X-axis and a Y-axis. However a ball screw may be applied to the present invention.

What is claimed is:

1. A laser processing machine having a programmable focus positioning function comprising a torch that is exchangeably mounted on a processing head of the laser processing machine, the torch, comprising:

a torch body;

a lens holder that holds a collective lens and is mounted axially slidably in the torch body;

an assist gas chamber that is provided between a lens holder and a nozzle attached to a tip of the torch;

a balance chamber that is provided on the processing head side of the lens holder;

a passage that supplies assist gas to the assist gas chamber and the balance chamber; and a gas spring chamber that is provided in an outer periphery portion of the lens holder and urges the lens holder toward the processing head side, a driving device mounted on the processing head side, comprising:

a servomotor that is driven by a program of a numerical control device; and an arm that is driven by the servomotor along an axis parallel to a torch axis, wherein the arm is in contact with the lens holder for positioning the lens holder in an axial direction.

2. The laser processing machine having a programmable focus positioning function according to claim 1, wherein a pressure reception area of the assist gas chamber is equal to a pressure reception area of the balance chamber.

3. The laser processing machine having the programmable focus positioning function according to claim 1, wherein a first force acting on lens holder upwards is provided in the assist gas chamber and a second force acting on the lens holder downwards is provided in the balance chamber, and the lens holder is held in a stop position due to offset between the first force and the second force.

4. The laser processing machine having the programmable focus positioning function according to claim 1, wherein the torch body comprises a slit that is formed in the torch body and extends in an axial direction and a pin that is attached to the lens holder and projects toward outside of the torch body through the slit, and the arm of the driving device is in contact with the pin for positioning the lens holder toward the torch.

5. The laser processing machine having the programmable focus positioning function according to claim 1, wherein a driving mechanism for driving the arm of the driving device in an axial direction comprises a ball screw that is rotatably driven by a servomotor, a nut that is attached to the arm and screwed together with the ball screw, and a translation guide that guides the arm in an axial direction.

6. The laser processing machine having the programmable focus positioning function according to claim 1, wherein a gas spring circuit for supplying a positive pressure gas to the gas spring chamber of the torch comprises a two-port valve and has a function of shutting gas supply during removal of the torch.

7. The laser processing machine having the programmable focus positioning function according to claim 1, wherein the torch having a plurality of properties is prepared in a torch station of a setup station and the torch comprises a device for automatically exchanging the most appropriate torch.

8. The laser processing machine having the programmable focus positioning function according to claim 1, wherein the torch is driven by a driving device that is separately placed from the torch body.

\* \* \* \* \*